(12) United States Patent
Blohm

(10) Patent No.: US 6,439,158 B1
(45) Date of Patent: Aug. 27, 2002

(54) BIRD FEEDER

(76) Inventor: Walter Blohm, P.O. Box 6422, Napa, CA (US) 94581

( * ) Notice: Subject to any disclaimer, the term of this patent is extended or adjusted under 35 U.S.C. 154(b) by 0 days.

(21) Appl. No.: 09/799,920

(22) Filed: Mar. 7, 2001

(51) Int. Cl.[7] .............................................. A01K 61/02
(52) U.S. Cl. ...................................................... 119/57.8
(58) Field of Search ............................ 119/57.8, 51.01, 119/52.2, 52.4

(56) References Cited

U.S. PATENT DOCUMENTS

| | | | | |
|---|---|---|---|---|
| 461,665 A | * | 10/1891 | Hefner | 423/341 |
| 3,125,069 A | * | 3/1964 | Fowler | 119/77 |
| 4,441,458 A | * | 4/1984 | Mercil | 119/51 R |
| 4,712,512 A | * | 12/1987 | Schreib et al. | 119/52.2 |
| 5,410,986 A | * | 5/1995 | Washam | 119/52.2 |
| 5,507,249 A | * | 4/1996 | Shaw | 119/72 |
| 5,682,835 A | * | 11/1997 | Walter et al. | 119/57.8 |
| D397,529 S | * | 8/1998 | Fuller et al. | D30/124 |
| 5,947,054 A | * | 9/1999 | Liethen | 119/52.3 |
| 6,305,319 B1 | * | 10/2001 | Olsson | 119/51.01 |
| D454,669 S | * | 3/2002 | Lieb | D30/125 |

* cited by examiner

Primary Examiner—Peter M. Poon
Assistant Examiner—Kevin Jakel

(57) ABSTRACT

Bird Feeder with a plurality of horn shaped hollow seed retaining portions, the horn shaped seed retainting portions radiating from a central location, the central location covered with a removable, replaceable dome shaped cover, the horn shaped portions terminating at the central end in a seed receiving aperture and at the opposite end in a seed dispensing dish, the seed dish portion being covered by a raised protective cover, the seed dish portion having water drain holes at its bottom, said seed dish portion being surrounded by a spring loaded perch, and said entire bird feeder assembly being supported by a centrally located string or wire.

1 Claim, 5 Drawing Sheets

2: DOMED SHAPED COVER
4,6,8,10,12,14: HOLLOW HORN SHAPED COMPARTMENTS
16: SEED RESERVOIR COVER
18: SEED RESERVOIR DISPENSING AREA
20: PERCH
24: STRING OR WIRE
26: STANDARD METAL HOLDING ROD
27: CONNECTING BALL
28: ROD STAKED INTO GROUND
29: SPRING
100: ENTIRE BIRD FEEDER

LEGEND

PERSPECTIVE VIEW OF BIRD FEEDER

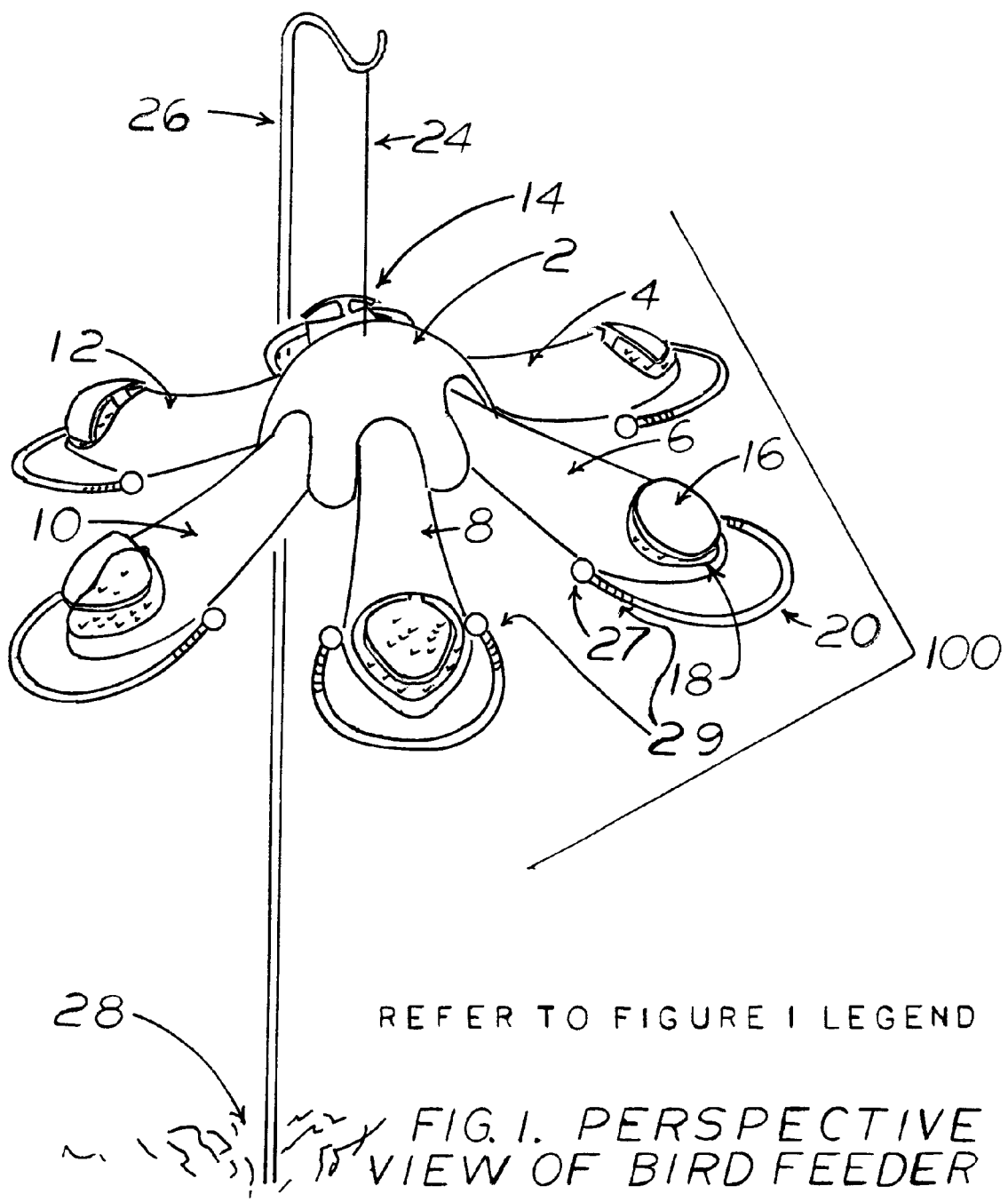
FIG. 1. PERSPECTIVE VIEW OF BIRD FEEDER

2: DOMED SHAPED COVER
4,6,8,10,12,14: HOLLOW HORN SHAPED COMPARTMENTS
16: SEED RESERVOIR COVER
18: SEED RESERVOIR DISPENSING AREA
20: PERCH
24: STRING OR WIRE
26: STANDARD METAL HOLDING ROD
27: CONNECTING BALL
28: ROD STAKED INTO GROUND
29: SPRING
100: ENTIRE BIRD FEEDER

*FIG. 1 LEGEND*

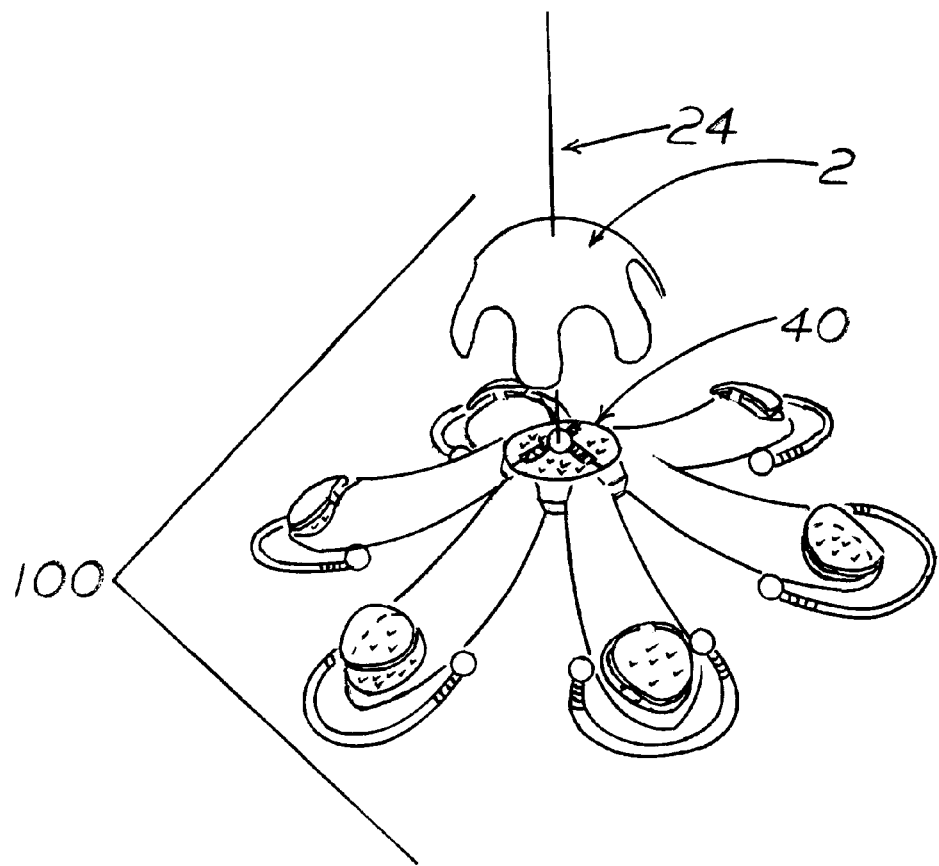
2: DOME SHAPED COVER
24: STRING OR WIRE
40: CENTRAL SEED FILLING AREA
100: ENTIRE BIRD FEEDER
FIG. 2A. VIEW FROM ABOVE.
DOME SHAPED COVER 2
RAISED

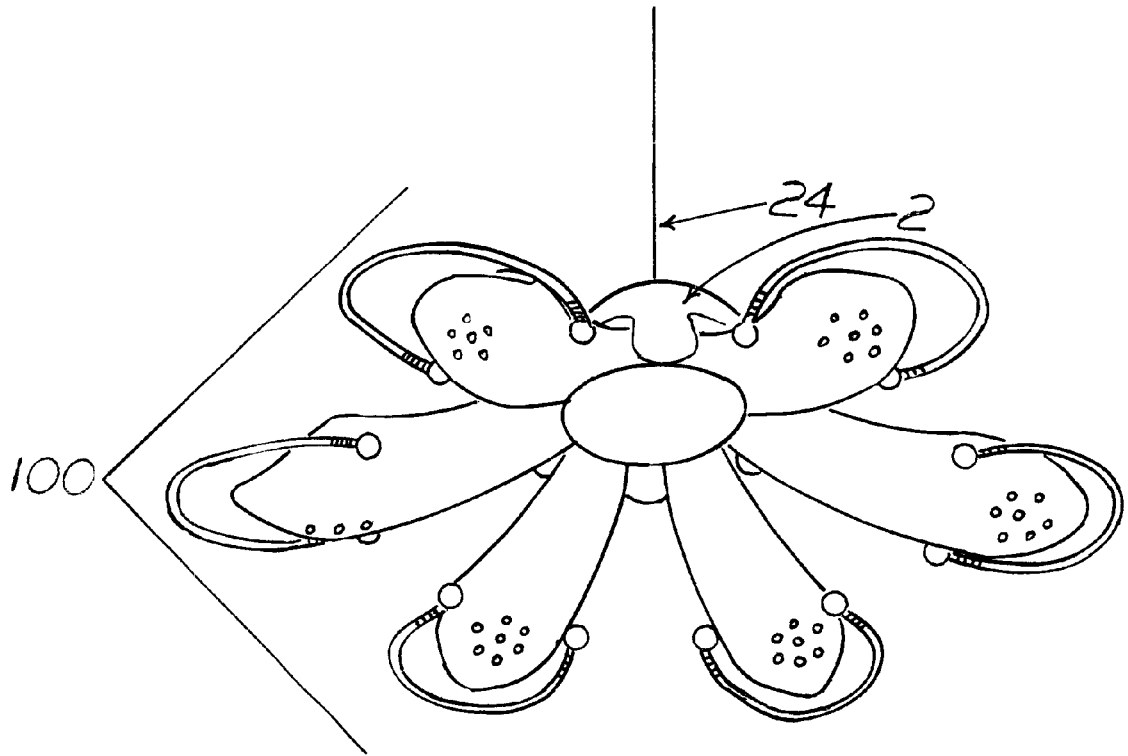
2: DOME SHAPED COVER
24: STRING OR WIRE
100: ENTIRE BIRD FEEDER
FIG. 2B. VIEW FROM BELOW.
DOME SHAPED COVER 2
LOWERED

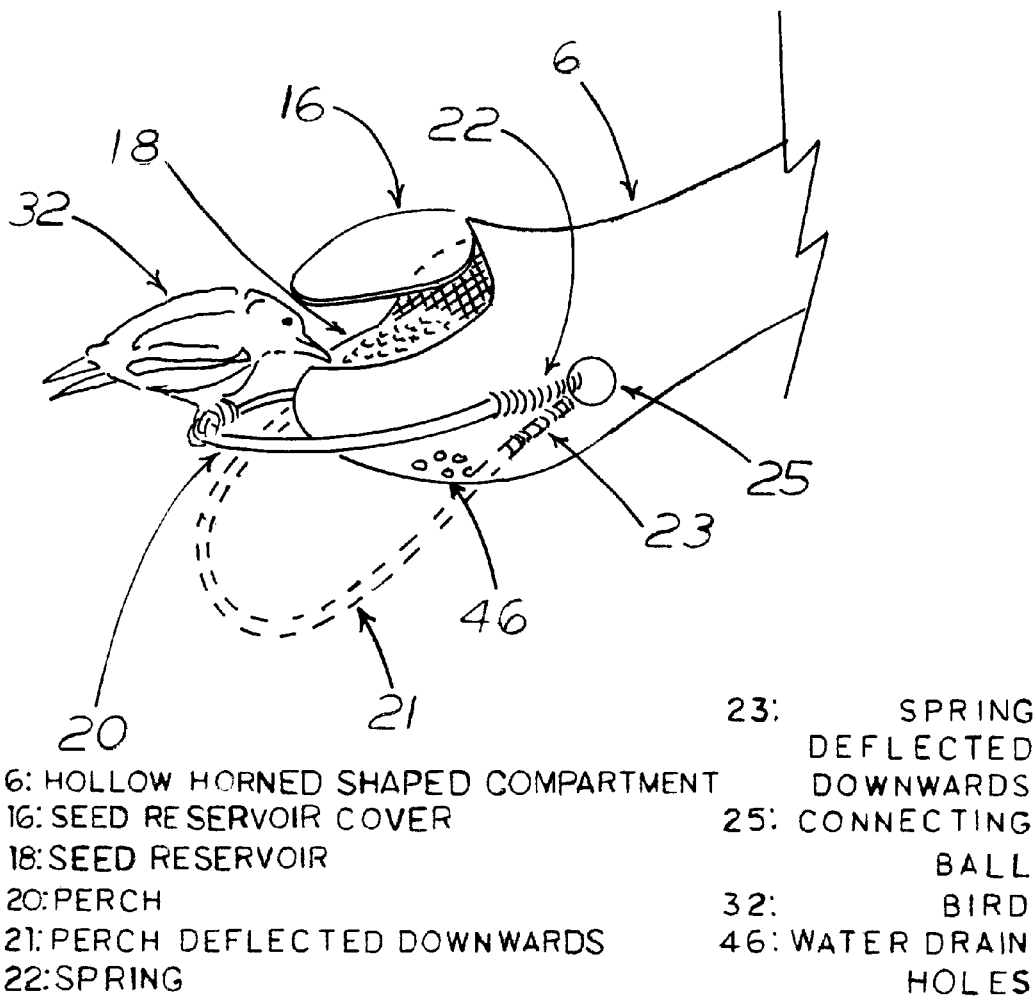
FIG. 3. SIDE VIEW OF A PORTION OF A SINGLE HORNED SHAPED CONTAINER 6.

BIRD FEEDER

BACKGROUND OF THE INVENTION

This invention relates generally to the field of animal feeding devices, and more particularly to a bird feeder.

Bird feeders have been made and used for many years. People generally hang bird feeders in a back yard so that local birds can partake of the seed and the residence of the property can enjoy the sight and sound of the birds. A typical bird feeder is generally box shaped and has a seed dispensing tray at the bottom portion. Some feeders are cylindrical in shape and have a plurality of perches, each in close proximity to a aperture that provides access to bird seed.

Other bird feeders may be hexagonal or of octagon shape. Although most bird feeders provide reasonably satisfactory service in the feeding of birds, there are some deficiencies in current designs. One problem with existing feeders is that other, such as squirrels can have access to the feed and therefore reduce the chance of availability of seed the the birds. Additionally, larger birds such as crows may crowd out smaller birds that have a harder time finding feed, especially in winter time. Finally, many feeders do not have adequate drainage in the feed storage area thereby causing the seed to become moldy due to retention of water from rainfall. This mold has been demonstrated to cause illness to birds.

SUMMARY OF THE INVENTION

The primary object of the invention is to provide a bird feeder that discourages other animals such as squirrels from taking seed from the feeder.

Another object of the invention is to provide a bird feeder that has a plurality of feeding stations.

Another object of the invention is to provide a bird feeder that is easy to refill.

A further object of the invention is to provide a bird feeder that includes drain holes to prevent water from collecting in the feeder.

Other objects and advantages of the present invention will become apparent from the following descriptions, taken in connection with the accompanying drawings, wherein, by way of illustration and example, an embodiment of the present invention is disclosed.

Bird Feeder comprising: a plurality of horn shaped hollow seed retaining portions, said horn shaped seed retaiting portions radiating from a central location, said central location covered with a removable, replaceable dome shaped cover, said horn shaped portions terminating at said central end in a seed receiving aperture and at the opposite end in a seed dispensing dish, said seed dish portion being covered by a raised protective cover, said seed dish portion having water drain holes at its bottom, said seed dish portion being surrounded by a spring biassed perch, and said entire bird feeder assembly being supported by a centrally located string or wire.

The drawings constitute a part of this specification and include exemplary embodiments to the invention, which may be embodied in various forms. It is to be understood that in some instances various aspects of the invention may be shown exaggerated or enlarged to facilitate an understanding of the invention.

BRIEF DESCRIPTION OF THE DRAWINGS

FIG. 1 is a perspective view of the bird feeder of the present invention

FIG. 2 is a perspective view of the present invention showing the seed entrance area FIG. 3 is a side view of the present invention showing a bird feeding

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Referring now to FIG. 1 we see a perspective view of the bird feeder of the present invention 100. The feeder consists of a plurality of hollow horn shaped compartments 6, 8, 10, 12, 14 that are attached centrally 40 and covered centrally by dome shaped cover 2. Each horn shape angles down slightly, approximately fifteen degrees, from the smaller central end 40 to the larger seed dispensing end 18. In this way, the seed automatically slides down inside the horn shape to replenish the dispensing area 18 as the birds eat and remove the seed. The plurality of spaced horn shapes allows a number of birds to feed simultaneously without getting in each others way. The entire bird feeder 100 is balanced so that it can hang evenly by a centrally located string or wire 24. In the present view a standard metal holding rod 26 is holding the feeder 100 in the air. Rod 26 is staked into the ground 28. Of course the feeder 100 can be hung on a tree branch or the like. FIG. 2 shows how the central dome shaped cover 2 can be raised along string 24 to reveal a central filling area 40. In this way a person can fill all the horn shaped containers at one convenient location. FIG. 3 shows a side view of a portion of a single horn shaped container 6. A bird 32 is sitting on perch 20 which puts him or her in perfect proximity to seed reservoir 18. The perch 20 is held at both ends by spring 22, 29. Springs 22, 29 terminate in connecting balls 25, 27 which in turn are fixedly attached to the side walls or horn shape 6. In this way, if a larger animal such as a squirrel tries to get to the bird feed, the perch will be deflected downwards 21, 23 so that the animal will fall off. Even larger birds such as crows will be discouraged from using the feeder thereby giving smaller birds more of an advantage for feeding purposes. Cover 16 protects the seed from rain and snow. A plurality of holes 46 are located at the bottom of each seed reservoir so that any water that may enter the seed dispensing area 18 can freely drain out and thereby preclude the possibility of water retention and associated mold buildup.

In the above described and illustrated way the bird feeder of the present invention can readily feed a plurality of birds while the spring biassed perches discourage use by other larger animals such as squirrels. The entire feeder is balanced so that it can hang from one central string or wire. A centrally located seed entry point makes re filling easy and covered, drainable seed dispensing areas provide dry healthy seed for hungry birds.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. Bird Feeder comprising:

a plurality of horn shaped hollow seed retaining portions;

said horn shaped seed retainting portions radiating from a central location;

said central location covered with a removable, replaceable dome shaped cover;

said horn shaped portions terminating at said central end in a seed receiving aperture and at the opposite end in a seed dispensing dish;

said seed dish portion being covered by a raised protective cover;

said seed dish portion having water drain holes at its bottom;

said seed dish portion being surrounded by a spring loaded perch; and said entire bird feeder assembly being supported by a centrally located string or wire.

* * * * *